United States Patent [19]

Kumasaka et al.

[11] Patent Number: 5,079,276

[45] Date of Patent: Jan. 7, 1992

[54] METHOD OF MANUFACTURING POLYURETHANE FOAM

[75] Inventors: Sadao Kumasaka; Satomi Tada; Koretoshi Katsuki, all of Tokyo; Osamu Fujii, Konosu; Shigeo Kuga, Kawagoe, all of Japan

[73] Assignee: Human Industry Corporation, Tokyo, Japan

[21] Appl. No.: 379,641

[22] Filed: Jul. 13, 1989

[30] Foreign Application Priority Data

Jul. 20, 1988 [JP] Japan ............................. 63-181140
Aug. 16, 1988 [JP] Japan ............................. 63-203519

[51] Int. Cl.$^5$ .................... C08G 18/08; C08J 9/00; C08J 9/04
[52] U.S. Cl. .................................. 521/170; 521/174; 521/914; 521/917
[58] Field of Search ................. 521/174, 170, 917, 914

[56] References Cited

U.S. PATENT DOCUMENTS

| | | | |
|---|---|---|---|
| 3,031,271 | 4/1962 | Weinbrenner et al. | 422/133 |
| 3,476,292 | 11/1969 | Joseph et al. | 222/135 |
| 3,482,822 | 12/1969 | Krizak et al. | 366/177 |
| 3,620,680 | 11/1971 | Bartel et al. | 422/138 |
| 3,821,130 | 6/1974 | Barron et al. | 521/133 |
| 4,199,547 | 4/1980 | Levinsky et al. | 521/917 |
| 4,410,378 | 10/1983 | Hattori et al. | 149/109.6 |

FOREIGN PATENT DOCUMENTS

| | | |
|---|---|---|
| 0070324 | 1/1983 | European Pat. Off. . |
| 1128125 | 4/1962 | Fed. Rep. of Germany . |
| 1520572 | 3/1970 | Fed. Rep. of Germany . |
| 3507202 | 9/1986 | Fed. Rep. of Germany . |
| 3616100 | 11/1986 | Fed. Rep. of Germany . |
| 811110 | 4/1959 | United Kingdom . |
| 895779 | 5/1962 | United Kingdom . |
| 957748 | 5/1964 | United Kingdom . |
| 1053235 | 12/1966 | United Kingdom . |
| 1071081 | 6/1967 | United Kingdom . |

Primary Examiner—John Kight, III
Assistant Examiner—Rabon Sergent
Attorney, Agent, or Firm—Frishauf, Holtz, Goodman & Woodward

[57] ABSTRACT

A method of manufacturing polyurethane foams comprising the steps of mixing a polyol and an organic isocyanate without causing them to substantially react with each other thereby to obtain a nonreacted mixture, mixing the nonreacted mixture with a foaming agent, a catalyst, a foam stabilizer and other necessary additives such as a pigment, a fire retardant and a filler, and injecting the resultant mixture to a mold to cause the resultant mixture to foam and crosslink. The polyol and the organic isocyanate may be preliminarily mixed with a gas such as an inert gas or air. The nonreacted mixture containing the polyol and organic isocyanate may be subjected to aging at a temperature of $-10°$ to $25°$ C. for 12 to 27 hours.

18 Claims, 10 Drawing Sheets

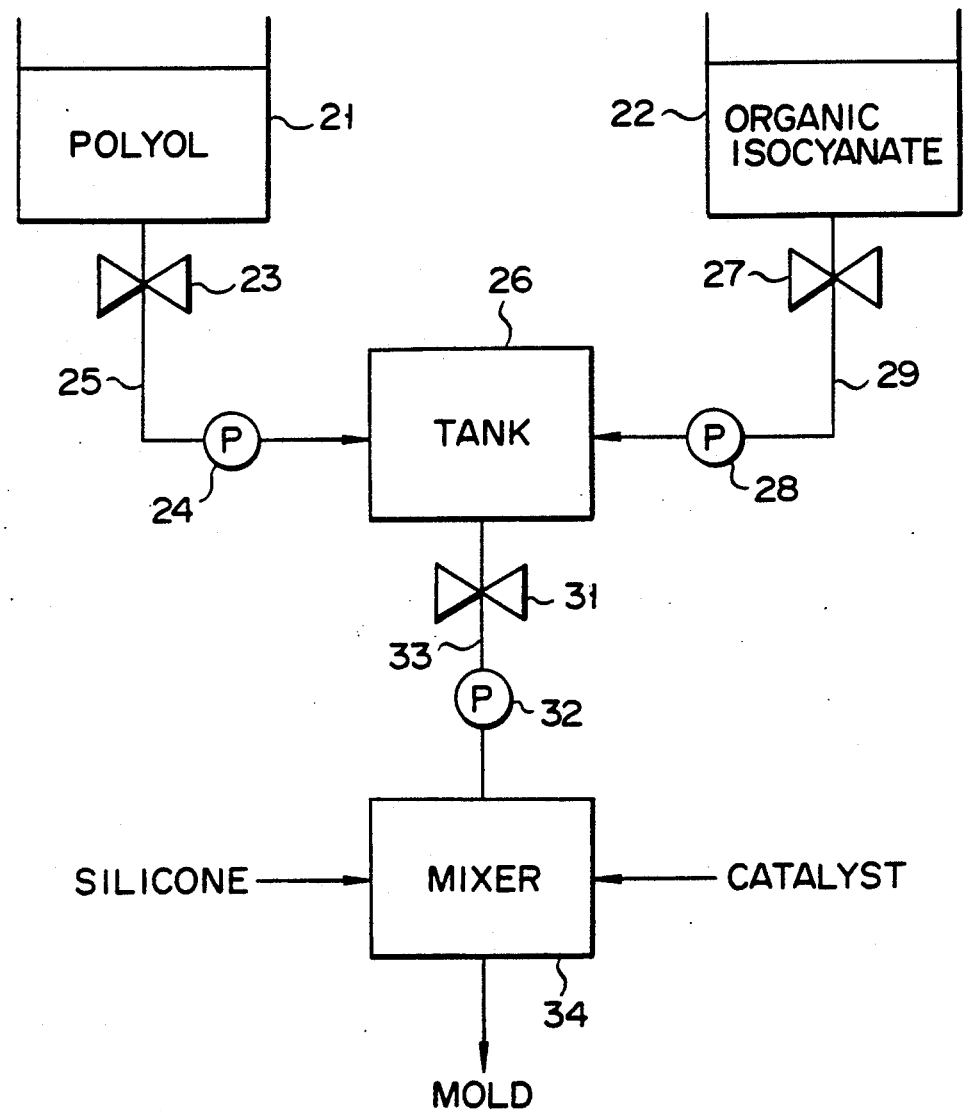
F I G. 2

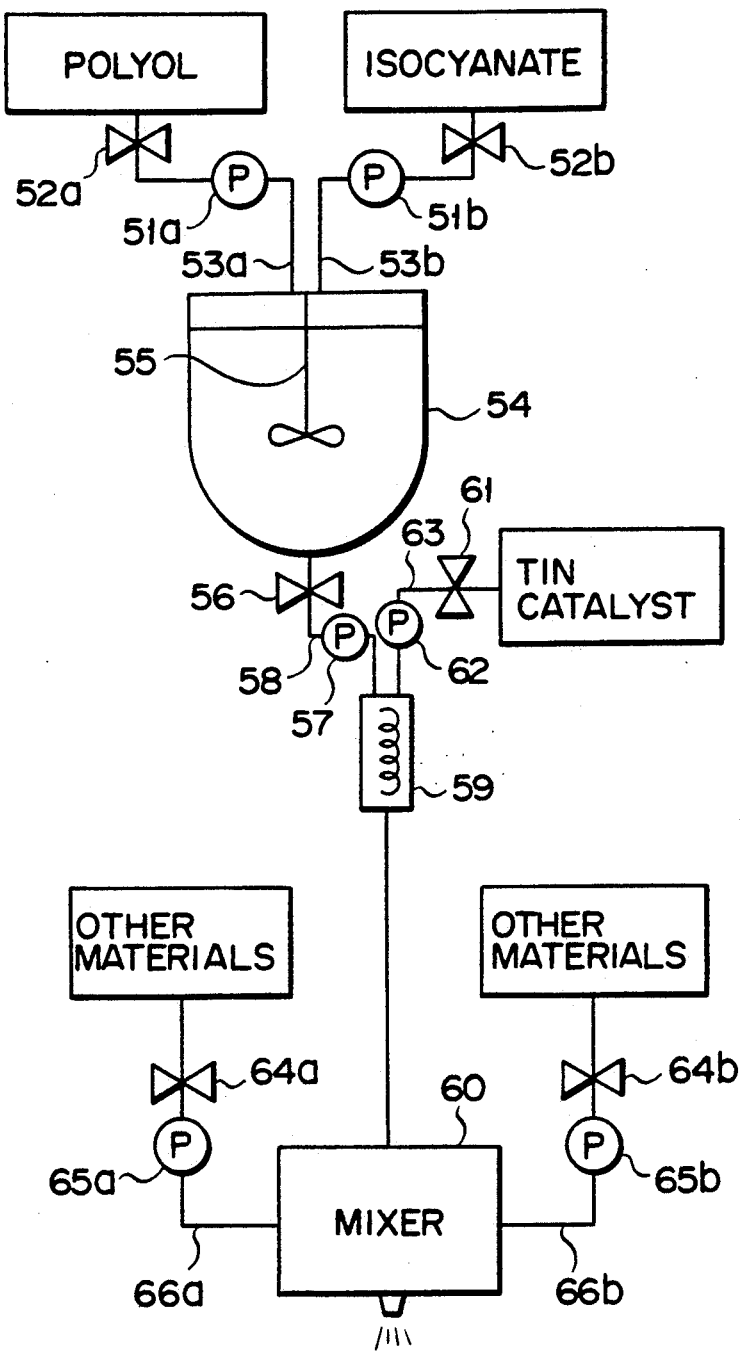
F I G. 5

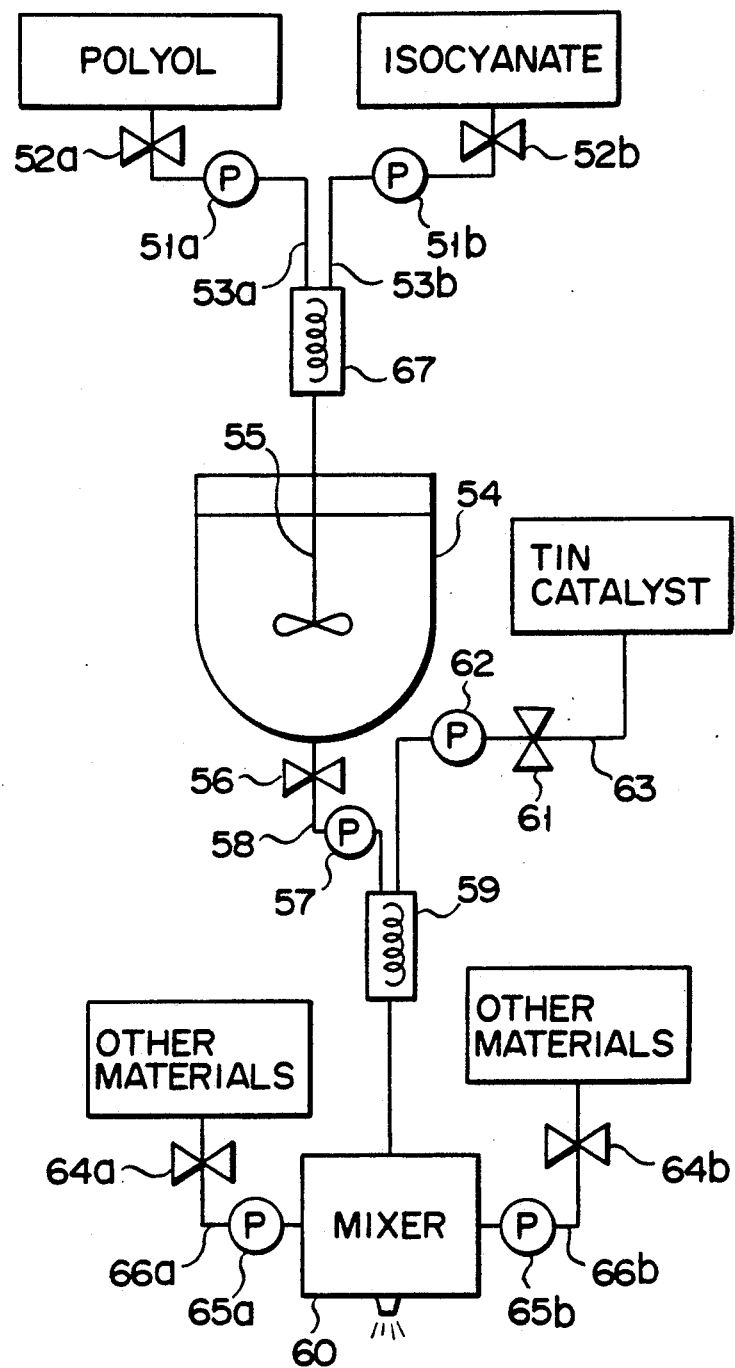
F I G. 6

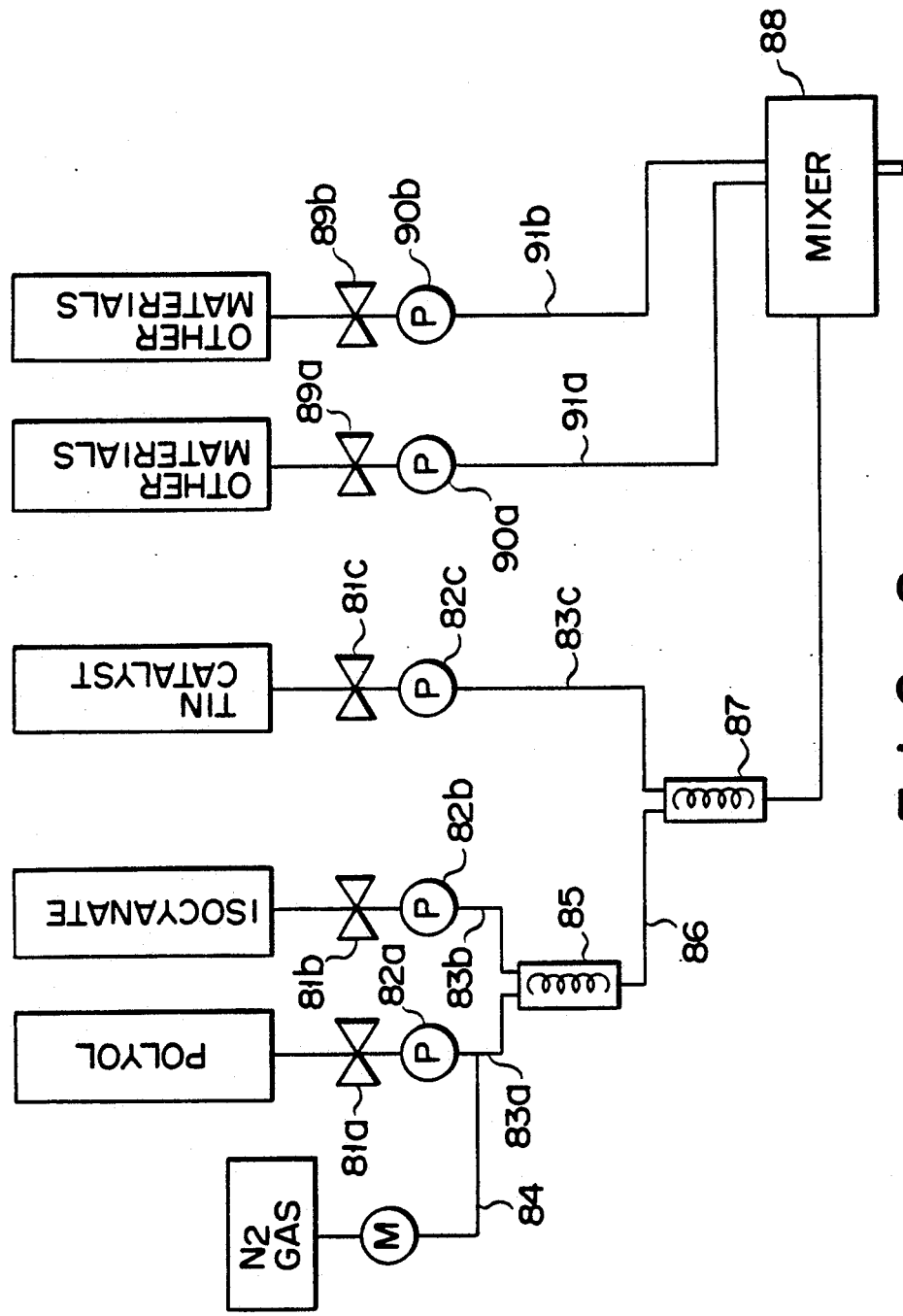
F I G. 8

METHOD OF MANUFACTURING POLYURETHANE FOAM

BACKGROUND OF THE INVENTION

1. Field of the Invention

The present invention relates to a method of manufacturing a polyurethane foam and, more particularly, to a method of manufacturing a polyurethane foam having uniform cells.

2. Description of the Prior Art

One- and two-stage methods are available in a conventional method of manufacturing a polyurethane foam. The one-stage method called a one-shot method has been frequently employed due to productivity and any other reasons. A schematic arrangement for practicing the conventional one-shot method is shown in FIG. 1. Referring to FIG. 1, reference numeral 1 denotes a first material tank which stores a polypropylene glycol (PPG) 3 as one major material; and 2, a second material tank which stores an organic isocyanate (e.g., tolylenediisocyanate (TDI)) 4 as the other major material. Material supply pipes 5 and 6 are respectively connected to the first and second material tanks 1 and 2 to supply the PPG 3 and the TDI 4 to a mixer 7. Valves 8 and 9 are arranged along the material supply pipes 5 and 6, respectively. Pumps 10 and 11 are also arranged midway along the material supply pipes 5 and 6, respectively. Upon driving of the pumps 10 and 11, the PPG 3 and TDI 4 can be supplied to the mixer 7. The amount of materials to be supplied to the mixer 7 can be suitably adjusted. Silicone, a catalyst, and other materials are also supplied to the mixer 7. The materials supplied to the mixer 7 are mixed to prepare a foamable solution. This solution is delivered from a mixing head arranged in the mixer 7.

A polyurethane foam can be manufactured by using the above apparatus as follows. The valves 8 and 9 are controlled to open to supply the PPG and the TDI from the material tanks 1 and 2 to the mixer 7. At the same time, a catalyst, a foam stabilizer (silicone), water, a low-boiling material, and the like are also supplied from a separate system to the mixer 7. These materials are sufficiently mixed in the mixer 7, and a foamable solution is injected from an injection port to molds. Foaming of the foamable solution injected into the molds is started immediately after the injection, and the foamable solution is gelled to form a polyurethane foam.

In the conventional method of manufacturing a polyurethane foam by using the above apparatus, the materials cannot always be satisfactorily mixed by the mixer, and various problems caused by insufficient mixing are posed. In the conventional method, the PPG, the TDI, water, the gelling catalyst, the foaming catalyst, the foam stabilizer, and other materials are supplied to the mixer, and stirring, mixing, and injection are continuously performed by the mixer, thus causing unsatisfactory mixing. When stirring time is increased to sufficiently mix the materials by the mixer, reactions of the materials are started to increase a viscosity of a foamable solution. An increase in stirring time is therefore impractical. For this reason, efficient stirring within a short period of time must be performed. The structure of the mixer has been improved to perform efficient stirring. However, the improvements cannot always be satisfactory, and many problems are left unsolved. According to the conventional method, the chemical reactions during foaming are often unbalanced to cause cracking or abnormal reactions which cause scorching in the resultant foams. As a result, low-density, high-hardness foams cannot be obtained by the conventional method.

A prepolymer method is also available as a conventional method of manufacturing an urethane foam. According to this method, since the reaction between the PPG and the TDI is completed, the reaction product has a high viscosity. The reaction product cannot be easily reacted with a catalyst, water, and the like. For this reason, a TDI must be added to the reaction product to control the chemical reaction, resulting in low productivity and high cost.

SUMMARY OF THE INVENTION

It is an object of the present invention to solve reaction unbalance caused by insufficient mixing of materials and to manufacture an excellent polyurethane foam free from defects (e.g., cracks and scorch) supposed to be caused by abnormal reactions.

It is another object of the present invention to provide a method of manufacturing polyurethane foams wherein their hardness values can be freely controlled, ranging from a low hardness to a high hardness at low specific gravities.

It is still another object of the present invention to provide a method of manufacturing polyurethane foams, wherein freon gas which poses a problem of environmental pollution need not be used as a foaming agent, and only water is used as a foaming agent, thereby obtaining polyurethane foams having uniform cells and uniform physical properties.

In order to achieve the above objects of the present invention, there is provided a method of manufacturing a polyurethane foam by supplying a polyol, an organic isocyanate, a foaming agent, a catalyst, a foam stabilizer, and other necessary additives such as a pigment, a fire retardant, and a filler to a mixer, mixing and stirring the polyol, the organic isocyanate, the foaming agent, the catalyst, the foaming stabilizer, and the other additives such as the pigment, the fire retardant, and the filler, and injecting a foamable solution, comprising the steps of:

(i) supplying the polyol and the organic isocyanate from different lines to a blender and causing the blender to mix the polyol and the organic isocyanate to obtain a nonreacted mixture containing the polyol and the organic isocyanate;

(ii) supplying the nonreacted mixture to the mixer and causing the mixer to mix the nonreacted mixture with the foaming agent, the catalyst, the foam stabilizer, and the other necessary additives such as the pigment, the fire retardant, and the filler; and (iii) injecting the resultant mixture obtained in the step (ii) from the mixer to foam and crosslink the mixture.

The step (i) is performed under a condition which substantially inhibits a reaction between the polyol and the organic isocyanate, i.e., (a) in an atmosphere at $-10°$ C. to $25°$ C., (b) in an inert gas atmosphere, (c) in an atmosphere which is substantially free from moisture, or any combination of conditions (a) to (c).

When the catalyst, or water, the foam stabilizer, and the foaming agent are added to the solution mixture of the polyol and the organic isocyanate in the step (ii), an adjusting organic isocyanate may be added to and mixed with the solution mixture.

After the nonreacted mixture is obtained in the step (i), it may be mixed with a gelling catalyst (e.g., a tin compound) by another blender, and the resultant mixture may be supplied to the step (ii).

In addition, the gelling catalyst such as a tin compound may be supplied from another line to the blender in the step (i) and may be mixed with the polyol and the organic isocyanate. The resultant mixture may be supplied to the step (ii).

Furthermore, the nonreacted mixture obtained in the step (i) may be stirred and aged in the blender or an aging tank upon supply of the nonreacted mixture from the blender to the aging tank at −10° C. for 12~72 hours. The aged mixture may be supplied to the step (ii). The aged mixture may be mixed by another blender with the gelling catalyst supplied from another line, and the resultant mixture may be supplied to the step (ii).

Moreover, a predetermined amount of a gas such as an inert gas or air may be supplied to the blender from another line in the step (i) and may be stirred and mixed with the polyol and the organic isocyanate. The resultant mixture may be supplied singly or together with the gelling catalyst to the step (ii). In this case, the nonreacted mixture obtained in the step (i) may be stirred and mixed by another blender with a gas supplied from another line, or with this gas and the gelling catalyst. The resultant mixture may be supplied to the step (ii).

The materials used in the present invention are a polyol and an organic isocyanate, as in the conventional method. Examples of the polyol are polyether polyol and polyester polyol which can be obtained by addition-polymerizing propylene oxide or ethylene oxide with a compound having an OH group. Examples of the organic isocyanate are tolylenediisocyanate (TDI), 4.4′ diphenylmethaneisocyanate (MDI), hexanediisocyanate (HDI), and xylenediisocyanate (XDI).

BRIEF DESCRIPTION OF THE DRAWINGS

FIGS. 2 to 10 are block diagrams showing methods of manufacturing polyurethane resin foams according to the present invention.

DETAILED DESCRIPTION OF THE PREFERRED EMBODIMENTS

Figure 1:
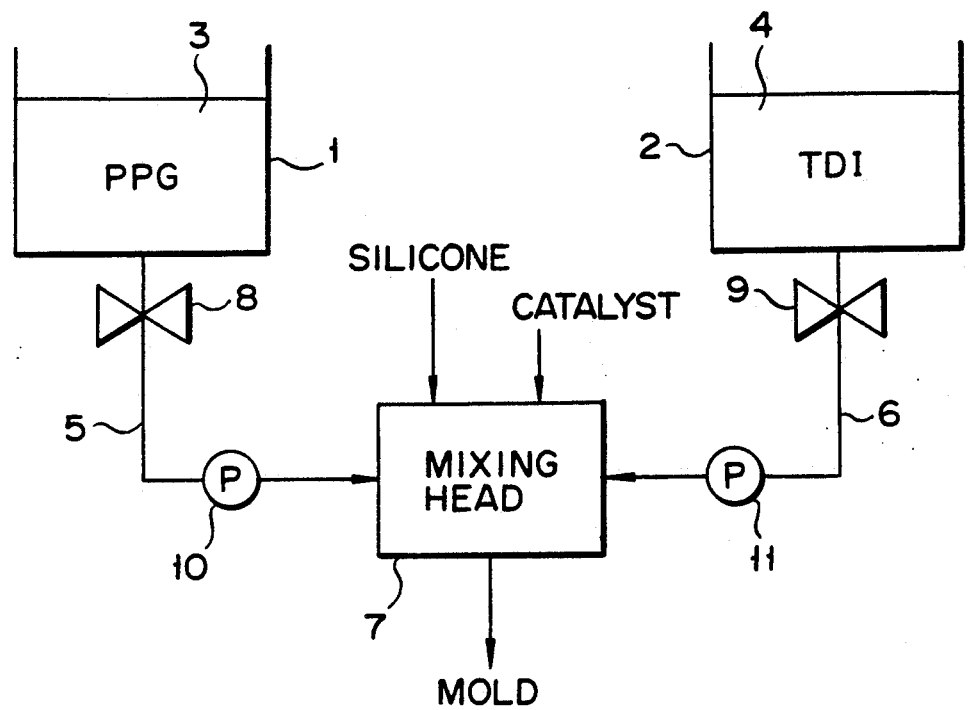
FIG. 1 is a block diagram for explaining a conventional method of manufacturing a polyurethane resin foam.

Preferred embodiments of the present invention will be described with reference to the accompanying drawings.

EXAMPLES 1-3

Reference numeral 21 in FIG. 2 denotes a tank which contains a polyol; and 22, a tank which contains an organic isocyanate. The tank 21 is connected to a tank 26 through a pipe 25. A valve 23 and a pump 24 are arranged midway along the pipe 25. The tank 22 is connected to the tank 26 through a pipe 29. A valve 27 and a pump 28 are arranged midway along the pipe 29. The tank 26 is connected to a mixer 34 having a mixing head through a pipe 33. A valve 31 and a pump 32 are arranged midway along the pipe 33. A foam stabilizer (silicone), a catalyst, and the like are also supplied to the mixer 34.

In Examples 1 to 3, by using the apparatus described above, a polypropylene glycol as a polyol was supplied from the tank 21 to the tank 26 through the pipe 25, and a tolylenediisocyanate as an organic isocyanate was supplied from the tank 22 to the tank 26 through the pipe 29. The polypropylene glycol and tolylenediisocyanate were mixed in the tank 26 in, e.g., a nitrogen gas atmosphere. Since these materials were mixed in the nitrogen gas atmosphere, a uniform solution mixture in which the polypropylene glycol was not substantially reacted with the tolylenediisocyanate was obtained. The resultant nonreacted solution mixture in the tank 26 was supplied to the mixer 34 through the pipe 33. At the same time, a catalyst, water, a foam stabilizer, and a foaming agent were also supplied to the mixer 34 and were sufficiently mixed with the nonreacted solution mixture. The resultant solution was supplied from the mixing head arranged in the mixer 34 to predetermined molds, thereby manufacturing polyurethane foams. Conditions such as contents of the materials, temperatures, and times used in Examples 1 to 3 are summarized in Table 1 below.

TABLE 1

|  | Example 1 | Example 2 | Example 3 |
|---|---|---|---|
| Polypropylene Glycol*[1] (parts by weight) | 100 | 100 | 100 |
| Tolylenediisocyanate*[2] (parts by weight) | 60 | 78 | 88 |
| H₂O (parts by weight) | 4.0 | 5.5 | 6.5 |
| Amine Catalyst (1)*[3] (parts by weight) | 0.35 | 0.3 | 0.25 |
| Amine Catalyst (2)*[4] (parts by weight) | 0.5 | 0.5 | 0.53 |
| Tin Catalyst*[5] (parts by weight) | 0.45 | 0.6 | 0.8 |
| Foam Stabilizer*[6] (parts by weight) | 1.0 | 1.0 | 1.0 |
| Aging Temperature After Curing (°C.) | 15 | 20 | 15 |
| Aging Time After Curing (H) | 48 | 24 | 72 |
| Foaming Temperature (°C.) | 25 | 25 | 25 |
| Specific Gravity | 0.028 | 0.022 | 0.018 |

*[1] Tradename MN-3050; available from Mitsui Toatsu Chemicals, Inc.
*[2] Tradename T-80; available from Mistui Toatsu Chemicals, Inc.
*[3] Tradename DMEA; available from Nitto Kasei K.K. (triethylenediamine)
*[4] Tradename 33LV; available from Toyo Sada K.K. (normal ethylmorpholine)
*[5] Tradename U-28; available from Nitto Kasei K.K. (dibutyltin dilaurate)
*[6] Tradename SRX-280A; available from Toray Silicone K.K. (silicone oil)

According to Examples 1 to 3, the polypropylene glycol is mixed with the tolylenediisocyanate in the nitrogen gas atmosphere in the tank 26 in which their reaction is sufficiently inhibited. These materials are not adversely affected by moisture in air or the like and can be uniformly mixed from the microscopic point of view. Therefore, defects such as cracks and scorch caused by abnormal reactions can be minimized in foams prepared by adding the catalyst, the foam stabilizer, the like to the nonreacted solution mixture. In addition, cells constituting the foams can become dense as compared with the conventional cell structures, and hardness can be increased by 30% or more. Cushion bodies having various hardness values can be obtained. Moreover, although freon gas is used in conventional manufacture of foams, it need not be used in the present invention so that the environmental conditions can be greatly improved. Even if the polypropylene glycol is reacted with the tolylenediisocyanate in the tank 26, one of the pipes for supplying these materials can be checked since they are supplied from the different pipes 25 and 26.

EXAMPLE 4

Although the PPG and the TDI were mixed in the $N_2$ atmosphere in Example 1, a PPG and TDI were mixed in air in the tank while a temperature of the interior of the tank was maintained at a temperature of $-10°$ C. to $25°$ C. in this example. A polyurethane foam was obtained following the same procedures as in Example 1. The resultant polyurethane foam had uniform cells and a specific gravity of 0.028 g/cm$^3$.

In Examples 1 to 4, the PPG and the TDI are supplied to and mixed in the tank. However, the PPG and the TDI may be mixed for a sufficiently long period of time while these materials are being supplied through the pipe 33. In this case, the pipe 33 must be kept cool by using a cooling means.

EXAMPLES 5-7

The interior of the tank 26 of the apparatus shown in FIG. 2 was kept at, e.g., 20° C. and was filled with nitrogen gas to prevent a polyol from reacting with an organic isocyanate in Examples 5 to 7. The polyols and the organic isocyanates were respectively mixed with each other at mixing ratios shown in Table 2 and were stirred for 15 minutes in Examples 5 to 7. The solution mixtures of the polypropylene glycol and isocyanate were maintained at temperatures of 15° C., 15° C., and 20° C. in Examples 5 to 7, respectively. The solution mixtures were heated to 25° C. by using a jacket (not shown) arranged around the storage tank during the reaction. Each heated solution mixture was supplied to the mixer 34 by the pump 32 upon opening of the valve 31. Water, an amine catalyst, a tin catalyst, and a foam stabilizer in addition to the above major materials were also supplied to the mixer 34 in amounts shown in Table 2. These materials were finally stirred and mixed in the mixer 34. Each resultant foamable solution was injected from the mixing head arranged in the mixer 34 to the molds. The speed of the mixer was 5,000 rpm, as shown in Table 2. Upon injection of each foamable solution, the foamed polyurethane product was supplied to an oven at 100° C. or 90° C. and was cured for 6 minutes. Thereafter, the polyurethane foams were aged at room temperature for 24 to 72 hours. The specific gravities of the resultant foams fell within the range of 0.028 to 0.018 g/cm$^3$, as shown in Table 2.

Since the PPG and TDI materials were uniformly mixed, the reaction could smoothly progress. No cracking or scorching occurred in the foams. In addition, the cells of these foams were dense as compared with the conventional cell structures. The hardness of the foams was increased to 16 kg.

TABLE 2

|  | Example 5 | Example 6 | Example 7 |
| --- | --- | --- | --- |
| Polypropylene Glycol | 100 | 100 | 100 |
| Tolylenediisocyanate | 60 | 78 | 88 |
| Water | 4.0 | 5.5 | 6.5 |
| Amine Catalyst (1)*[3] | 0.35 | 0.3 | 0.25 |
| Amine Catalyst (2)*[4] | 0.5 | 0.5 | 0.53 |
| Tin Catalyst*[5] | 0.45 | 0.6 | 0.8 |
| Foam Stabilizer*[6] | 1.0 | 1.0 | 1.0 |
| Preservation Temperature of Solution Mixture of PPG and TDI (°C.) | 15 | 20 | 15 |
| Temperature of Solution Mixture of PPG and TDI in Use (°C.) | 25 | 25 | 25 |
| Curing Temperature after Foaming (°C.) | 100 | 90 | 90 |
| Aging Time after Foaming and Curing (h) | 48 | 24 | 72 |
| Specific Gravity | 0.028 | 0.022 | 0.018 |

*[1]Tradename MN-3050; available from Mitsui Toatsu Chemicals, Inc.
*[2]Tradename T-80; available from Mitsui Toatsu Chemicals, Inc.
*[3]Tradename DMEA; available from Nitto Kasei K.K.
*[4]Tradename 33LV; available from Toyo Soda K.K.
*[5]Tradename U-28; available from Nitto Kasei K.K.
*[6]Tradename SRX-280A; available from Toray Silicone K.K.

EXAMPLE 8

A polyurethane foam was manufactured following the same procedures as in Example 5 except that the interior of the tank 26 was kept in a dry air atmosphere (humidity: 3%) in place of the $N_2$ atmosphere. The polyurethane foam had uniform cells and a specific gravity of 0.028 kg/mc$^3$.

The following materials were continuously supplied in amounts defined below from the corresponding material tanks to a mixer in an apparatus having material supply lines shown in FIG. 3:

|  | parts by weight |
| --- | --- |
| Trifunctional polyether polyol (molecular weight: 3,000; OH value: 56) | 100 |
| Tolylenediisocyanate (T-80) | 59.0 |
| Triethylenediamine (amine catalyst) | 0.3 |
| Normal ethylmorpholine (amine catalyst) | 0.4 |
| Water | 4.0 |
| Dibutyltin dilaurate (tin catalyst) | 0.2 |
| Silicone oil (foam stabilizer) | 1.5 |

Figure 3:
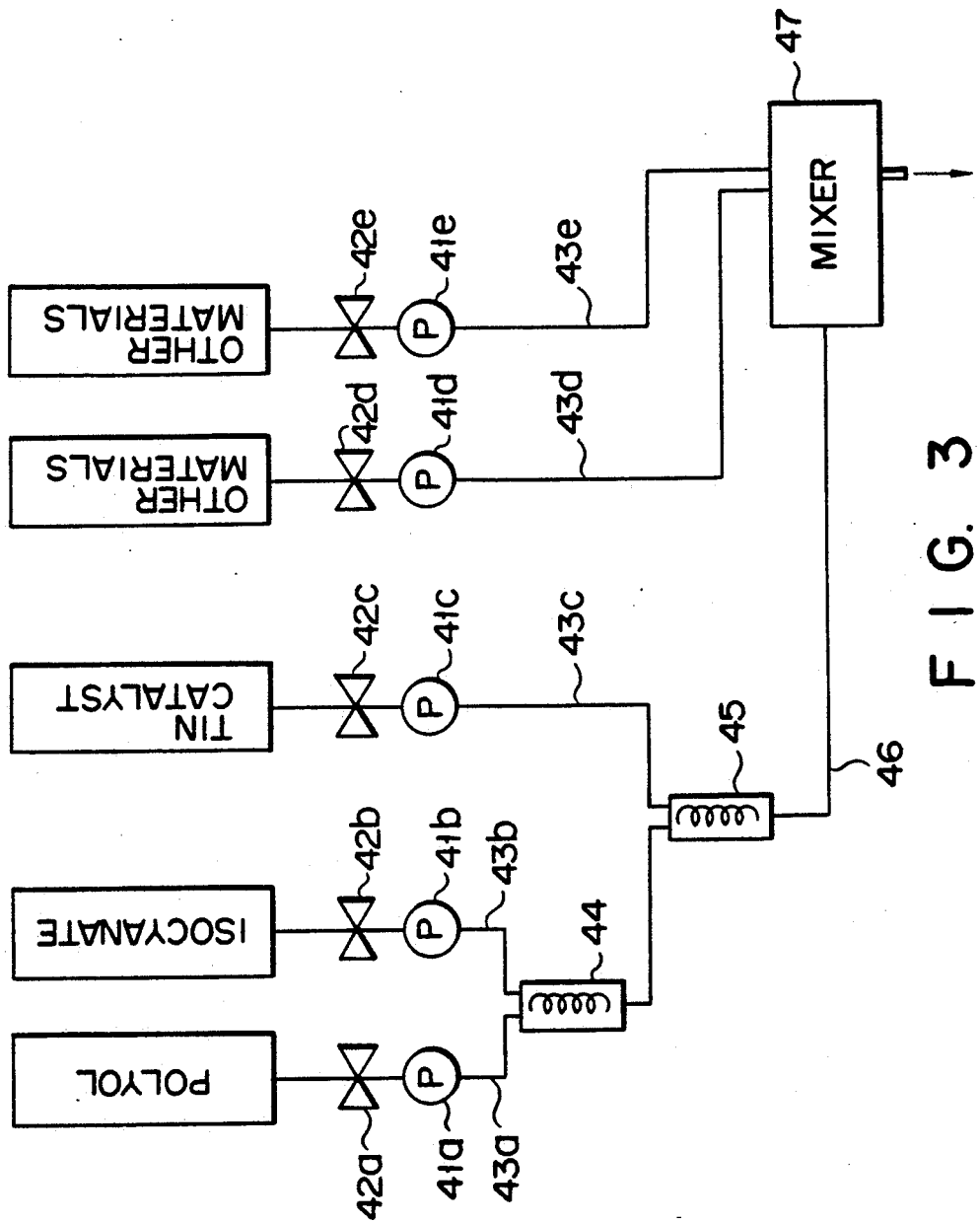

Pumps 41a and 41b were operated in the apparatus of FIG. 3 to open valves 42a and 42b so as to supply a polyether polyol and tolylenediisocyanate to supply pipes 43a and 43b at the predetermined ratio. These solutions were mixed by a first blender 44, and the resultant mixture was supplied to a second blender 45 through a supply pipe. The blenders used in Example 9 were Homomixers (available from Tokushu Kika Kogyo K.K.) The tin catalyst was continuously supplied to the second blender 45 through a supply pipe 43c in the same manner as the polyol. The blender 45 mixed the tin catalyst with the solution mixture of the polyol and the isocyanate. The resultant mixture of the three materials was supplied to a mixer 47 through a supply pipe 46. Other materials were also supplied to the mixer 47 through pipes 43d and 43e upon operations of valves 42d and 42e and pumps 41d and 41e in the same manner as the tin catalyst. "Other materials" include triethylenediamine (amine catalyst), normal ethylmorpholine (amine catalyst), water, and silicone oil (foam stabilizer). These materials were independently supplied to the mixer 47. An injection rate of the foamable solution was set to be 113 kg/sec, and the foamable solution was continuously injected according to a conventional method to an endless grooved conveyor to obtain a polyurethane foam slab. The density of the foamed product was 24 kg/cm$^3$, and the density of cells of the foam were very fine and uniform.

EXAMPLE 10

The following materials were continuously supplied in amounts defined below from the corresponding material tanks to a mixer in an apparatus having material supply lines shown in FIG. 4:

|  | parts by weight |
| --- | --- |
| Trifunctional polyether polyol (molecular weight: 3,000; HO value: 56) | 100 |
| Tolylenediisocyanate (T-80) | 71.0 |
| Triethylenediamine (amine catalyst) | 0.35 |
| Normal ethylmorpholine (amine catalyst) | 0.5 |
| Water | 5.0 |
| Dibutyltin dilaurate (tin catalyst) | 0.3 |
| Silicone oil (foam stabilizer) | 1.6 |

Figure 4:
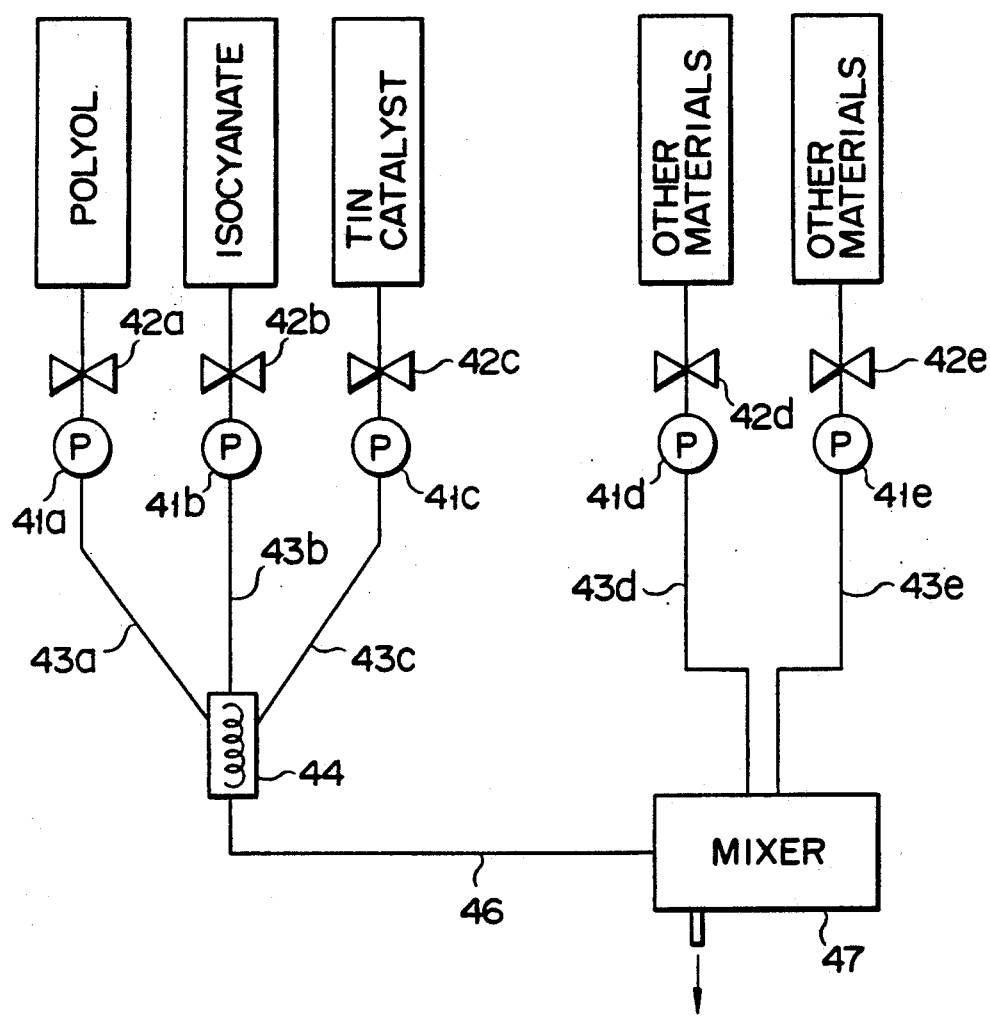

Pumps 41a, 41b, and 41c were operated in the apparatus of FIG. 4 to open valves 42a, 42b, and 42c to supply the polyether polyol, tolylenedi-isocyanate, and tin catalyst to supply pipes 43a, 43b, and 43c at the predetermined ratio. These solutions were mixed by a blender 44, and the resultant mixture was supplied to a mixer 47 through a supply pipe 46. Other materials were also supplied to the mixer 47 in the same manner as the polyol. "Other materials" include triethylenediamine (amine catalVst), normal ethylmorpholine (amine catalyst), water, and silicone oil (foam stabilizer). These materials were independently supplied to the mixer as in Example 9. An injection rate of the foamable solution was set to be 113 kg/sec, and the foamable solution was continuously injected to an endless grooved conveyor to obtain a polyurethane foam slab according to a conventional method. The density of the foamed product 17 kg/m$^3$, and the cells of the foam were very fine and uniform.

In Examples 9 and 10, the materials are mixed by the blenders or blender arranged midway along the supply pipe. Time required for supplying the mixture to the mixer is a short period of time, e.g., several seconds to several tens of seconds. Therefore, the reaction of the solution mixture and an increase in viscosity are prevented. In order to practice the present invention, the polyol and the organic isocyanate can be maintained at room temperature and are generally kept at 20° C. to 30° C.

EXAMPLE 11

The following materials were continuously supplied in amounts defined below from the corresponding material tanks to a mixer in an apparatus having material supply lines shown in FIG. 5:

|  | parts by weight |
| --- | --- |
| Trifunctional polyether polyol (molecular weight: 3,000; OH value: 56) | 100 |
| Tolylenediisocyanate (T-80) | 89.0 |
| Triethylenediamine (amine catalyst) | 0.07 |
| Normal ethylmorpholine (amine catalyst) | 0.70 |
| Water | 6.5 |
| Dibutyltin dilaurate (tin catalyst) | 0.9 |
| Silicone oil (foam stabilizer) | 1.8 |

Pumps 51a and 51b were operated to open valves 52a and 52b to supply the polyether polyol and tolylenediisocyanate to a storage tank 54 through supply pipes 53a and 53b at the predetermined ratio in the apparatus shown in FIG. 5. The volume of the storage tank 54 was 2,000 l. The materials were kept stirred by a stirrer 55 in the storage tank 54 for 24 hours to age the solution mixture. The operation of the stirrer was then stopped, and the solution mixture was removed from the bottom of the storage tank 54. More specifically, a valve 56 was opened and a pump 57 was driven to continuously supply the solution mixture to a supply pipe 58. The solution mixture was then supplied to a mixer 60 through a blender 59. Meanwhile, the blender 59 received the tin catalyst through a pipe 63 upon operation of a valve 61 and a pump 62 and mixed it with the solution mixture. The mixer 60 received other materials through pipes 66a and 66b upon operations of regulating valves 64a and 64b and pumps 65a and 65b and mixed them with the solution from the blender 59. "Other materials" include triethylenediamine (amine catalyst), normal ethylmorpholine (amine catalyst), water, and silicone oil (foam stabilizer). The resultant foamable solution was continuously injected from a mixing head to molds. An injection rate of the foamable solution was set to be 94 kg/min, and the foamable solution was continuously injected to an endless grooved conveyor to obtain a polyurethane foam slab according to a conventional method. The density of the foamed product was 19 kg/m$^3$ and the cells of the foam were very fine and uniform.

EXAMPLE 12

The following materials were continuously supplied in amounts defined below from the corresponding material tanks to a mixer in an apparatus having material supply lines shown in FIG. 6:

|  | parts by weight |
| --- | --- |
| Trifunctional polyether polyol (molecular weight: 3,000; OH value: 56) | 100 |
| Tolylenediisocyanate (T-80) | 97.0 |
| Triethylenediamine (amine catalyst) | 0.07 |
| Normal ethylmorpholine (amine catalyst) | 0.75 |
| Water | 7.2 |
| Dibutyltin dilaurate (tin catalyst) | 0.95 |
| Silicone oil (foam stabilizer) | 1.9 |

Pumps 51a and 51b were operated to open valves 52a and 52b to supply the polyether polyol and tolylenediisocyanate to a blender 67 through supply pipes 53a and 53b and then to a storage tank 54 at the predetermined ratio in the apparatus shown in FIG. 6. The volume of the storage tank 54 was 2,000 l. The materials were kept stirred by a stirrer 55 in the storage tank 54 for 48 hours to age the solution mixture. The operation of the stirrer was then stopped, and the solution mixture was removed from the bottom of the storage tank 54. More specifically, a valve 56 was opened and a pump 57 was driven to continuously supply the solution mixture to a supply pipe 58. The solution mixture was then supplied to a mixer 60 through a blender 59. Meanwhile, the blender 59 received the tin catalyst and mixed it with the solution mixture, and the mixer 60 received other materials and mixed them with the solution from the blender 59 as in FIG. 5. "Other materials" include triethylenediamine (amine catalyst), normal ethylmorpholine (amine catalyst), water, and silicone oil (foam stabilizer). The resultant foamable solution was continuously injected from a mixing head to molds. An injection rate of the foamable solution was set to be 94 kg/min, and the foamable solution was continuously injected according to a conventional method to an endless grooved conveyor to obtain a polyurethane foam slab. The density of the foamed product was 16 kg/m$^3$ and the cells of the foam were very fine uniform.

EXAMPLE 13

The following materials were continuously supplied in amounts defined below from the corresponding material tanks to a mixer in an apparatus having material supply lines shown in FIG. 7:

|  | parts by weight |
| --- | --- |
| Trifunctional polyether polyol (molecular weight: 3,000; OH value: 56) | 100 |
| Tolylenediisocyanate (T-80) | 79 |
| Triethylenediamine (amine catalyst) | 0.07 |
| Normal ethylmorpholine (amine catalyst) | 0.6 |
| Water | 6.0 |
| Dibutyltin dilaurate (tin catalyst) | 0.5 |
| Silicone oil (foam stabilizer) | 1.8 |

Figure 7:
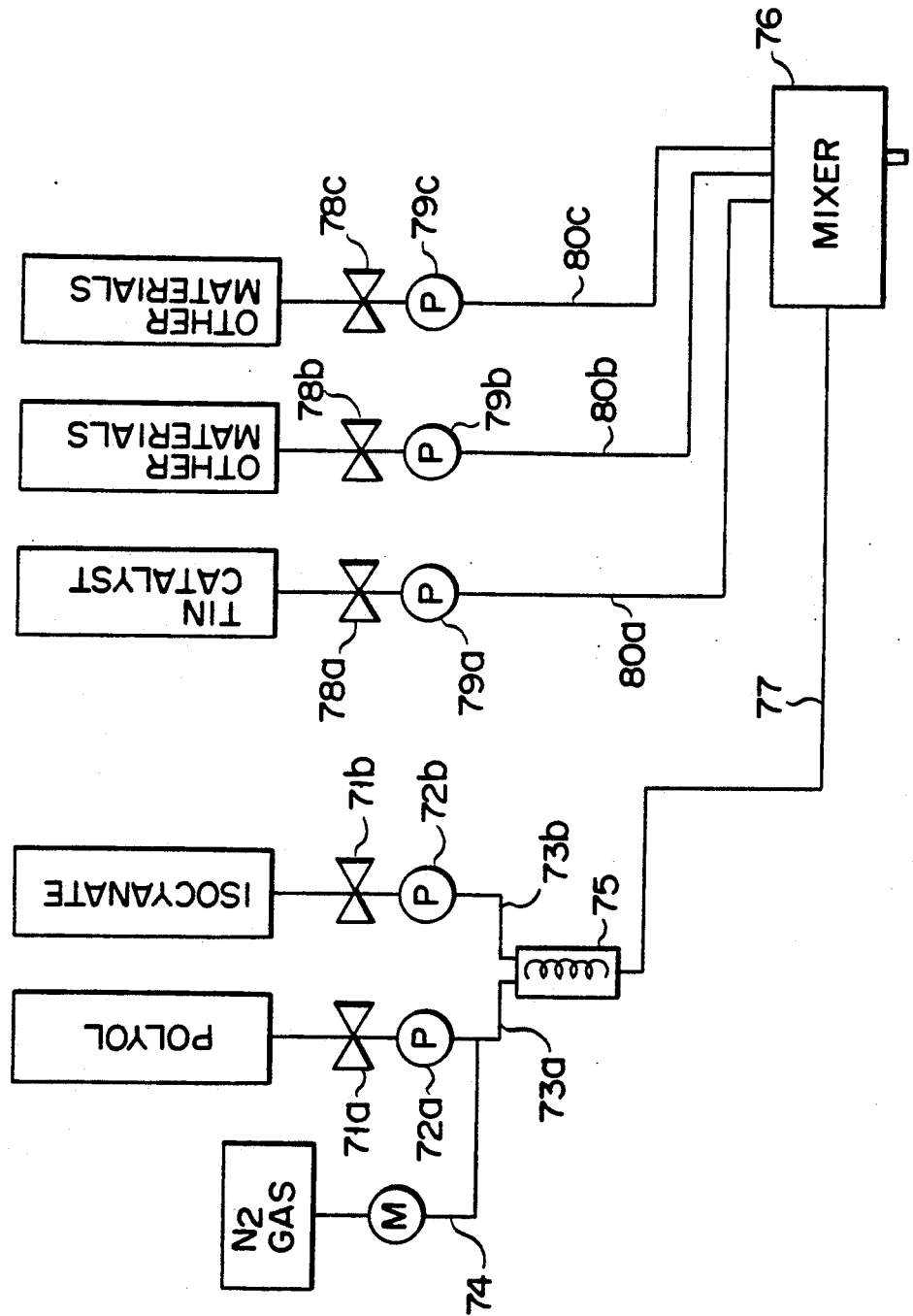

Pumps 71a and 71b were operated to open valves 72a and 72b in the apparatus shown in FIG. 7 to supply the polyether polyol and tolylenediisocyanate to supply pipes 73a and 73b at the predetermined ratio. In this case, nitrogen gas having a flow rate of 1.2 Nl/min was mixed in the supply pipe 73a for the polyol through a pipe 74 upon control of a flowmeter M. These solutions were mixed by a first blender 75 and the mixture was supplied to a mixture 76 through a supply pipe 77. The blender used in Example 13 was a Homomixer (available from Tokushu Kika Kogyo K.K.) The mixer 76 also received the tin catalyst together with other materials through pipes 80a to 80c upon operations of regulating valves 78a to 78c and pumps 79a to 79c. "Other materials" include triethylenediamine (amine catalyst), normal ethylmorpholine (amine catalyst), water, and silicone oil (foam stabilizer). An injection rate of the foamable solution injected from a mixing head was set to be 72 kg/min, and the foamable solution was continuously injected to an endless grooved conveyor to obtain a polyurethane foam slab according to a conventional method. The density of the foamed product was 16 kg/m and the cells of the foam were very fine and uniform.

EXAMPLE 14

The following materials were continuously supplied in amounts defined below from the corresponding material tanks to a mixer in an apparatus having material supply lines shown in FIG. 8:

|  | parts by weight |
| --- | --- |
| Trifunctional polyether polyol (molecular weight: 3,000; OH value: 56) | 100 |
| Tolylenediisocyanate (T-80) | 65 |
| Triethylenediamine (amine catalyst) | 0.06 |
| Normal ethylmorpholine (amine catalyst) | 0.5 |
| Water | 4.8 |
| Dibutyltin dilaurate (tin catalyst) | 0.3 |
| Silicone oil (foam stabilizer) | 1.5 |

Pumps 82a, 82b, and 82c were operated to open valves 81a, 81b, and 81c in the apparatus shown in FIG. 8 to supply the polyether polyol, tolylenediisocyanate, and tin catalyst to supply pipes 83a, 83b, and 83c at the predetermined ratio. In this case, nitrogen gas having a flow rate of 1.1 Nl/min was mixed in the supply pipe 83a for the polyol through a pipe 84. These material solutions were mixed by a blender 85, and the mixture was supplied to a supply pipe 86. The tin catalyst was mixed in these materials. The above materials were stirred and mixed by a blender 87, thereby obtaining a solution mixture in which fine bubbles were mixed in the solution mixture of the polyol and isocyanate. The solution mixture was continuously supplied to a mixer 88 through a pipe 92. The mixer 88 also received other materials through pipes 91a and 91b upon operations of valves 89a and 89b and pumps 90a and 90b and stirred and mixed them. "Other materials" include triethylenediamine (amine catalyst), normal ethylmorpholine (amine catalyst), water, and silicone oil (foam stabilizer). These materials were separately supplied to the mixer 88 as in Example 13. An injection rate of the foamable solution injected from the mixing head was set to be 113 kg/min, and the foamable solution was continuously injected to an endless grooved conveyor to obtain a polyurethane foam slab according to a conventional method. The density of the foamed product was 21 kg/m$^3$ and the cells of the foam were very fine and uniform.

EXAMPLE 15

The following materials were continuously supplied in amounts defined below from the corresponding material tanks to a mixer in an apparatus having material supply lines shown in FIG. 9:

|  | parts by weight |
| --- | --- |
| Trifunctional polyether polyol (molecular weight: 3,000; OH value: 56) | 100 |
| Tolylenediisocyanate (T-80) | 74 |
| Triethylenediamine (amine catalyst) | 0.07 |
| Normal ethylmorpholine (amine catalyst) | 0.5 |
| Water | 5.5 |
| Dibutyltin dilaurate (tin catalyst) | 0.4 |
| Silicone oil (foam stabilizer) | 1.6 |

Figure 9:
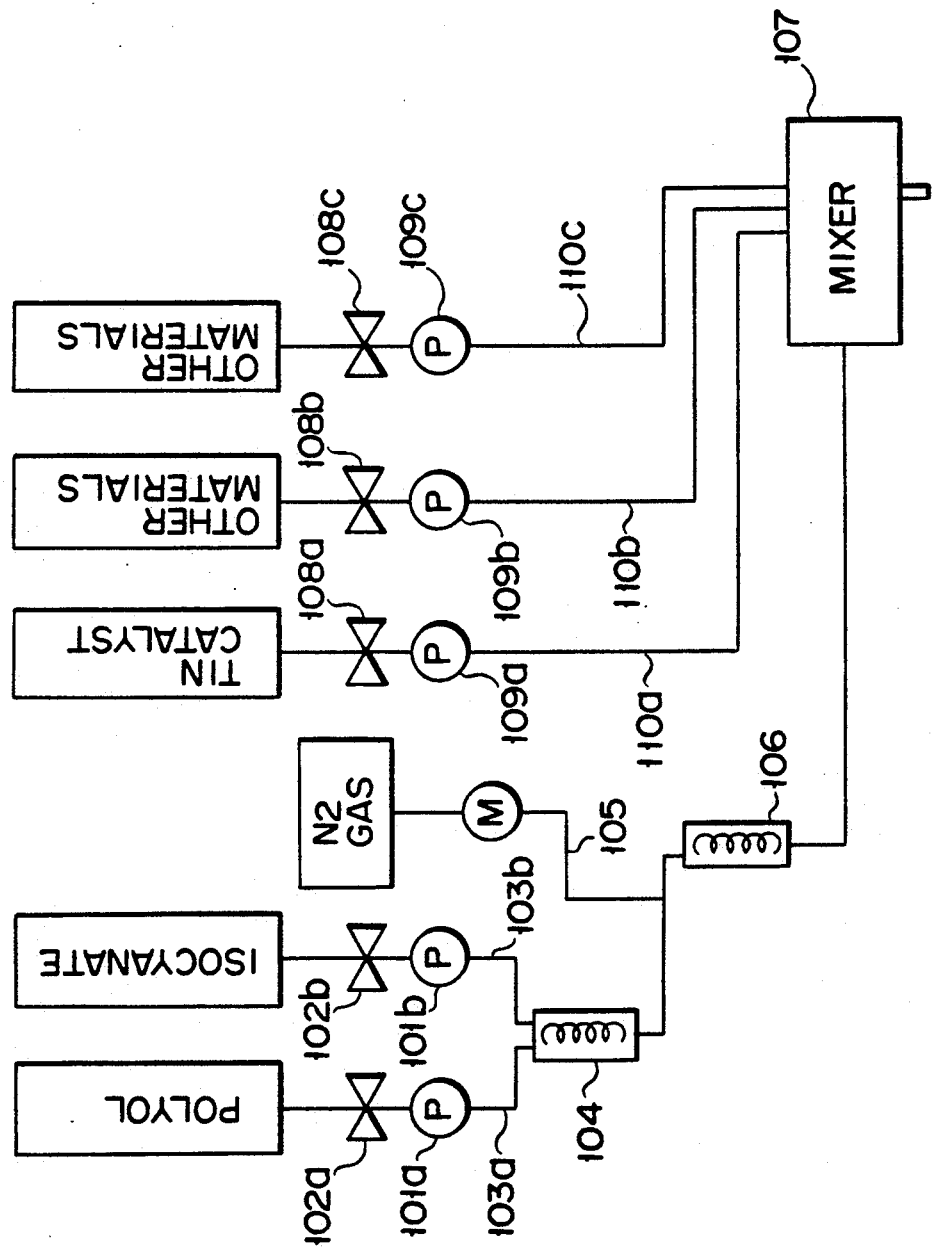

Pumps 101a and 101b were operated to open valves 102a and 102b in the apparatus shown in FIG. 9 to supply the polyether polyol and tolylenediisocyanate to supply pipes 103a and 103b at the predetermined ratio. These solutions were mixed by a first blender 104 and the mixture was mixed with nitrogen gas having a flow rate of 1.0 Nl/min through a pipe 105. The solution mixture with nitrogen gas was supplied to and stirred and mixed in a second blender 106. As a result, a solution containing fine bubbles in the solution mixture of the polyol and isocyanate was produced. The material solution containing fine bubbles was supplied to a mixer 107. The mixer 107 also received other materials together with the tin catalyst through pipes 110a to 110c upon operations of valves 108a to 108c and pumps 109a to 109c. "Other materials" include triethylenediamine (amine catalyst), normal ethylmorpholine (amine catalyst), water, and silicone oil (foam stabilizer), thereby preparing a foamable solution. The foamable solution was continuously injected from the mixing head to an endless grooved conveyor at a rate of 94 kg/min. thereby forming a polyurethane foam slab according to a conventional method. The density of the foamed product was 17 kg/m³ and the cells of the foam were very fine and uniform.

EXAMPLE 16

The following materials were continuously supplied in amounts defined below from the corresponding material tanks to a mixer in an apparatus having material supply lines shown in FIG. 10:

|  | parts by weight |
|---|---|
| Trifunctional polyether polyol (molecular weight: 3,000; OH value: 56) | 100 |
| Tolylenediisocyanate (T-80) | 68.0 |
| Triethylenediamine (amine catalyst) | 0.06 |
| Normal ethylmorpholine (amine catalyst) | 0.5 |
| Water | 5.0 |
| Dibutyltin dilaurate (tin catalyst) | 0.3 |
| Silicone oil (foam stabilizer) | 1.6 |

Figure 10:
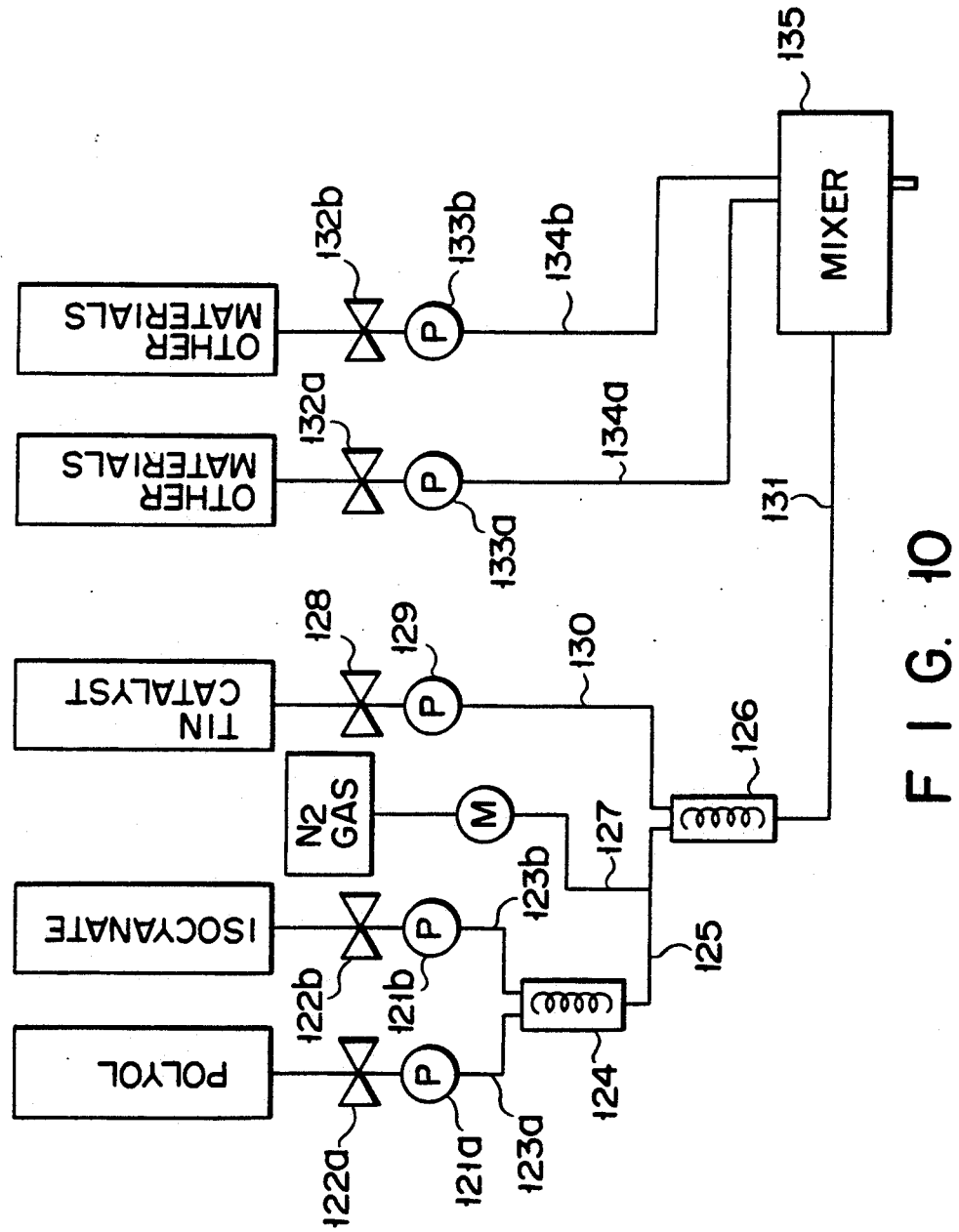

Pumps 121a and 121b were operated to open valves 122a and 122b in the apparatus shown in FIG. 10 to supply the polyether polyol and tolylenediisocyanate to supply pipes 123a and 123b at the predetermined ratio. These solutions were mixed by a first blender 124 and the mixture was supplied to a second blender 126. When the solution mixture of the polyol and isocyanate was supplied to the second blender 126, the solution mixture was added with nitrogen gas supplied through a pipe 127 and the tin catalyst supplied through a pipe 130 upon operation of a regulating valve 128 and a pump 129. Since the tin catalyst and nitrogen gas were stirred and mixed with the solution mixture of the polyol and isocyanate, fine bubbles were contained in the solution mixture of the three materials. The resultant solution mixture was supplied to a mixer 135 through a supply pipe 131. The mixer 135 also received triethylenediamine (amine catalyst), normal ethylmorpholine (amine catalyst), water, and silicone oil (foam stabilizer) through pipes 134a and 134b upon operations of valves 132a and 132b and pumps 133a and 133b. All the materials described above were mixed by the mixer 135, thereby preparing a foamable solution containing fine bubbles. In this case, a flow rate of the foamable solution was set to be 94 kg/min. The foamable solution was continuously injected from the mixing head to an endless grooved conveyor to form a polyurethane foam slab according to a conventional method. The density of the foamed product was 20 kg/m³ and the cells of the foam were very fine and uniform.

According to the present invention, the polyol and the organic isocyanate as major materials are uniformly mixed in a single system before they are supplied to the mixer, and the catalyst and other materials are added thereto to obtain a material solution mixture, thereby forming a foam. Therefore, the reaction can be smoothly performed to prevent cracking and scorching which is caused by abnormal reactions. In addition, since the material solution is uniformly mixed, the hardness, the specific gravity, and elasticity of the resultant products can be improved.

In addition, according to the present invention, uniform mixing and sufficient aging of the polyol and the isocyanate as major materials can be performed. The foamable solution as the final solution mixture obtained by mixing the material mixture with the catalyst and other materials can be excellent. For this reason, the foaming reaction using the foamable solution can be uniformly performed to provide a foam having uniform cells, a low specific gravity, and a high hardness.

Mixing of the major material solutions for polyurethane foaming is performed once or twice prior to supply of the mixture to the mixer. In addition, fine bubbles are contained in the solution mixture, and therefore the foamable solution injected from the mixing head is uniformly mixed and excellent in foamability. For this reason, the reaction of the foamable solution can be entirely and uniformly performed to obtain a foam having uniform cells.

What is claimed is:

1. A method of manufacturing a plyurethane foam by supplying a polyol, an organic isocyanate, a foaming agent, a catalyst, a foam stabilizer, and the other necessary additives such as a pigment, a fire retardant, and a filler to a mixer, mixing and stirring the polyol, the organic isocyanate, the foaming agent, the catalyst, the foaming stabilizer, and the other necessary additives such as the pigment, the fire retardant, and the filler, and injecting a foamable solution, comprising the steps of:

(i) supplying the polyol and the organic isocyanate from different lines to a blender and causing the blender to mix the polyol and the organic isocyanate under a condition which substantially inhibits a reaction between the polyol and the organic isocyanate to obtain a nonreacted mixture containing the polyol and the organic isocyanate;

(ii) supplying the nonreacted mixture to the mixer and causing the mixer to mix the nonreacted mixture with the foaming agent, the catalyst, the foam stabilizer, and other necessary additives such as the pigment, the fire retardant, and the filler; and (iii) injecting the resultant mixture obtained in the step (ii) from the mixer to foam and crosslink the mixture.

2. A method according to claim 1, wherein the step (i) is performed in (a) an atmosphere at −10° C. to 25° C., (b) an inert gas atmosphere, (c) an atmosphere which is substantially shielded from moisture, or any combination of conditions (a) to (c).

3. A method according to claim 1, wherein the step (ii) comprises the step of adding and mixing an adjusting organic isocyanate when the catalyst, or water, the foaming agent, and the foam stabilizer are added to the solution mixture.

4. A method according to claim 1, further comprising the step of causing another blender to mix the nonreacted mixture produced in the step (i) with a gelling catalyst and supplying the resultant mixture to the step (ii).

5. A method according to claim 4, wherein the gelling catalyst consists of a tin compound.

6. A method according to claim 1, further comprising the step of supplying a gelling catalyst from another line to the blender in the step (i), mixing the gelling catalyst with the polyol and the organic isocyanate, and supplying the resultant mixture to the step (ii).

7. A method according to claim 6, wherein the gelling catalyst consists of a tin compound.

8. A method according to claim 1, further comprising the step of supplying the nonreacted mixture produced in the step (i), stirring and aging the nonreacted mixture at $-10 \sim 25°$ C. for $12 \sim 72$ hours, and supplying the aged mixture to the step (ii).

9. A method according to claim 8, further comprising the step of mixing the aged mixture with a gelling catalyst in another blender, and supplying the resultant mixture to the step (ii).

10. A method according to claim 9, wherein the gelling catalyst consists of a tin compound.

11. A method according to claim 1, wherein the blender in the step (i) also serves as an aging tank, and further comprising the step of stirring and aging the nonreacted mixture in the blender at $-10 \sim 25°$ C. for $12 \sim 27$ hours, and supplying the aged mixture to the step (ii).

12. A method according to claim 11, further comprising the step of mixing the aged mixture with a gelling catalyst supplied from another line, mixing the aged mixture with the gelling catalyst in another blender, and supplying the resultant mixture to the step (ii).

13. A method according to claim 12, wherein the gelling catalyst consists of a tin compound.

14. A method according to claim 1, further comprising the step of stirring and mixing the mixture from the step (i) with a gelling catalyst in the blender in advance, and supplying the resultant mixture to the step (ii).

15. A method according to claim 1, further comprising the step of stirring and mixing the nonreacted mixture produced in the step (i) with a gas, supplied from another line, in another blender, and supplying the resultant mixture to the step (ii).

16. A method according to claim 15, wherein the gas is a material selected from the group consisting of an inert gas and air.

17. A method according to claim 1, further comprising the step of stirring and mixing the nonreacted mixture produced in the step (i) with a gas and a gelling catalyst which are supplied from different lines, and supplying the resultant mixture to the step (ii).

18. A method according to claim 17, wherein the gas is a material selected from the group consisting of an inert gas and air.

* * * * *